(12) United States Patent
Zachrisen et al.

(10) Patent No.: US 11,281,656 B2
(45) Date of Patent: Mar. 22, 2022

(54) METHODS AND SYSTEMS FOR MIGRATING DATA BETWEEN SYSTEMS WITHOUT DOWNTIME

(71) Applicant: Transform SR Brands LLC, Hoffman Estates, IL (US)

(72) Inventors: Espen Zachrisen, Bartlett, IL (US); Tariq Afeef, Streamwood, IL (US); Ganesh Venkatachalam, Round Lake, IL (US); Vinayak Subray Hegde, Hoffman Estates, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 124 days.

(21) Appl. No.: 16/709,148

(22) Filed: Dec. 10, 2019

(65) Prior Publication Data
US 2020/0117653 A1   Apr. 16, 2020

Related U.S. Application Data

(63) Continuation of application No. 14/335,540, filed on Jul. 18, 2014, now Pat. No. 10,503,723.
(Continued)

(51) Int. Cl.
*G06F 16/23* (2019.01)
*G06F 16/27* (2019.01)
*G06F 3/06* (2006.01)

(52) U.S. Cl.
CPC .......... *G06F 16/2365* (2019.01); *G06F 3/067* (2013.01); *G06F 3/0617* (2013.01); *G06F 3/0647* (2013.01); *G06F 16/27* (2019.01)

(58) Field of Classification Search
CPC .... G06F 3/0647; G06F 16/27; G06F 16/2365; G06F 3/0617; G06F 3/067
See application file for complete search history.

(56) References Cited

U.S. PATENT DOCUMENTS 5,832,522 A * 11/1998 Blickenstaff .......... G06F 3/0647
6,356,977 B2 * 3/2002 Ofek ..................... G06F 3/0607
                                                         709/217
(Continued)

FOREIGN PATENT DOCUMENTS

EP        1555604 A2      7/2005

OTHER PUBLICATIONS

European Search Report for European Application No. 14 177 725.0, dated Feb. 16, 2015, 7 pages.
(Continued)

*Primary Examiner* — William Spieler
(74) *Attorney, Agent, or Firm* — McAndrews, Held & Malloy, Ltd.

(57) ABSTRACT

Methods and systems are provided for migrating data between systems without downtime. User requests may be handled adaptively during migration of data records from a first record system to a second record system, to maintain access to the data during the migration. The handling may include receiving a user request; determining at least one data record associated with the received user request; determining if a copy of the data record in the first record system is still active; and if the copy of the data record in the first record system is still active, forwarding the user request to the first record system. The user request may be forwarded to the second record system if the copy of the data record in the first record system is not active, and a retry mechanism may be used if the user request is not handled by the second record system.

12 Claims, 4 Drawing Sheets

Related U.S. Application Data

(60) Provisional application No. 61/856,404, filed on Jul. 19, 2013.

(56) References Cited

U.S. PATENT DOCUMENTS

| | | | | |
|---|---|---|---|---|
| 7,293,133 | B1* | 11/2007 | Colgrove | G06F 3/0608 |
| | | | | 711/111 |
| 7,506,120 | B2* | 3/2009 | Morishita | G06F 3/061 |
| | | | | 711/162 |
| 7,640,408 | B1* | 12/2009 | Halligan | G06F 3/0617 |
| | | | | 711/162 |
| 7,707,151 | B1* | 4/2010 | Blumenau | G06F 3/067 |
| | | | | 711/165 |
| 8,010,485 | B1* | 8/2011 | Chatterjee | G06F 3/061 |
| | | | | 707/609 |
| 8,060,710 | B1 | 11/2011 | Don et al. | |
| 8,943,032 | B1 | 1/2015 | Xu et al. | |
| 9,519,516 | B2 | 12/2016 | Motoki | |
| 2003/0115434 | A1* | 6/2003 | Mahalingam | G06F 3/0643 |
| | | | | 711/165 |
| 2003/0182525 | A1* | 9/2003 | O'Connell | G06F 16/10 |
| | | | | 711/162 |
| 2004/0122869 | A1 | 6/2004 | Muehl et al. | |
| 2004/0162885 | A1 | 8/2004 | Garg et al. | |
| 2005/0055402 | A1* | 3/2005 | Sato | H04L 67/1097 |
| | | | | 709/205 |
| 2005/0083862 | A1* | 4/2005 | Kongalath | H04W 8/30 |
| | | | | 370/299 |
| 2006/0107010 | A1* | 5/2006 | Hirezaki | G06F 3/067 |
| | | | | 711/165 |
| 2006/0136691 | A1* | 6/2006 | Brown | G06F 3/0647 |
| | | | | 711/165 |
| 2007/0266059 | A1* | 11/2007 | Kitamura | G06F 16/907 |
| 2007/0299975 | A1 | 12/2007 | Daschakowsky et al. | |
| 2008/0168135 | A1 | 7/2008 | Redlich et al. | |
| 2009/0037679 | A1* | 2/2009 | Kaushik | G06F 3/067 |
| | | | | 711/162 |
| 2010/0131545 | A1* | 5/2010 | Srivastava | G06F 16/27 |
| | | | | 707/769 |
| 2011/0040943 | A1 | 2/2011 | Kondo et al. | |
| 2011/0246832 | A1 | 10/2011 | Akiyama et al. | |
| 2012/0059802 | A1 | 3/2012 | Daniello et al. | |
| 2012/0102286 | A1* | 4/2012 | Holt | G06F 3/0617 |
| | | | | 711/165 |
| 2012/0163150 | A1 | 6/2012 | Itagaki et al. | |
| 2012/0239616 | A1* | 9/2012 | Cunningham | G06F 16/273 |
| | | | | 707/620 |
| 2013/0085990 | A1* | 4/2013 | Mordvinova | G06F 16/2272 |
| | | | | 707/623 |
| 2013/0166507 | A1 | 6/2013 | Staczek | |
| 2013/0339390 | A1 | 12/2013 | Muller | |
| 2015/0205638 | A1 | 7/2015 | Motoki | |

OTHER PUBLICATIONS

Summons for Appearance at Oral Proceeding for European Application No. 14177725.0, dated Jan. 3, 2017, 41 pages.

* cited by examiner

METHODS AND SYSTEMS FOR MIGRATING DATA BETWEEN SYSTEMS WITHOUT DOWNTIME

CLAIM OF PRIORITY

This patent application is a continuation of U.S. patent application Ser. No. 14/335,540, filed on Jul. 18, 2014, which makes reference to, claims priority to and claims benefit from the U.S. Provisional Patent Application No. 61/856,404, filed on Jul. 19, 2013. Each of the above identified applications is hereby incorporated herein by reference in its entirety.

TECHNICAL FIELD

Aspects of the present application relate to user interactions. More specifically, certain implementations of the present disclosure relate to use of migrating data between systems without downtime.

BACKGROUND

Existing methods and systems, if any exist, for migrating data between systems can be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

System(s) and/or method(s) are provided for migrating data between systems without downtime, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Figure 1:
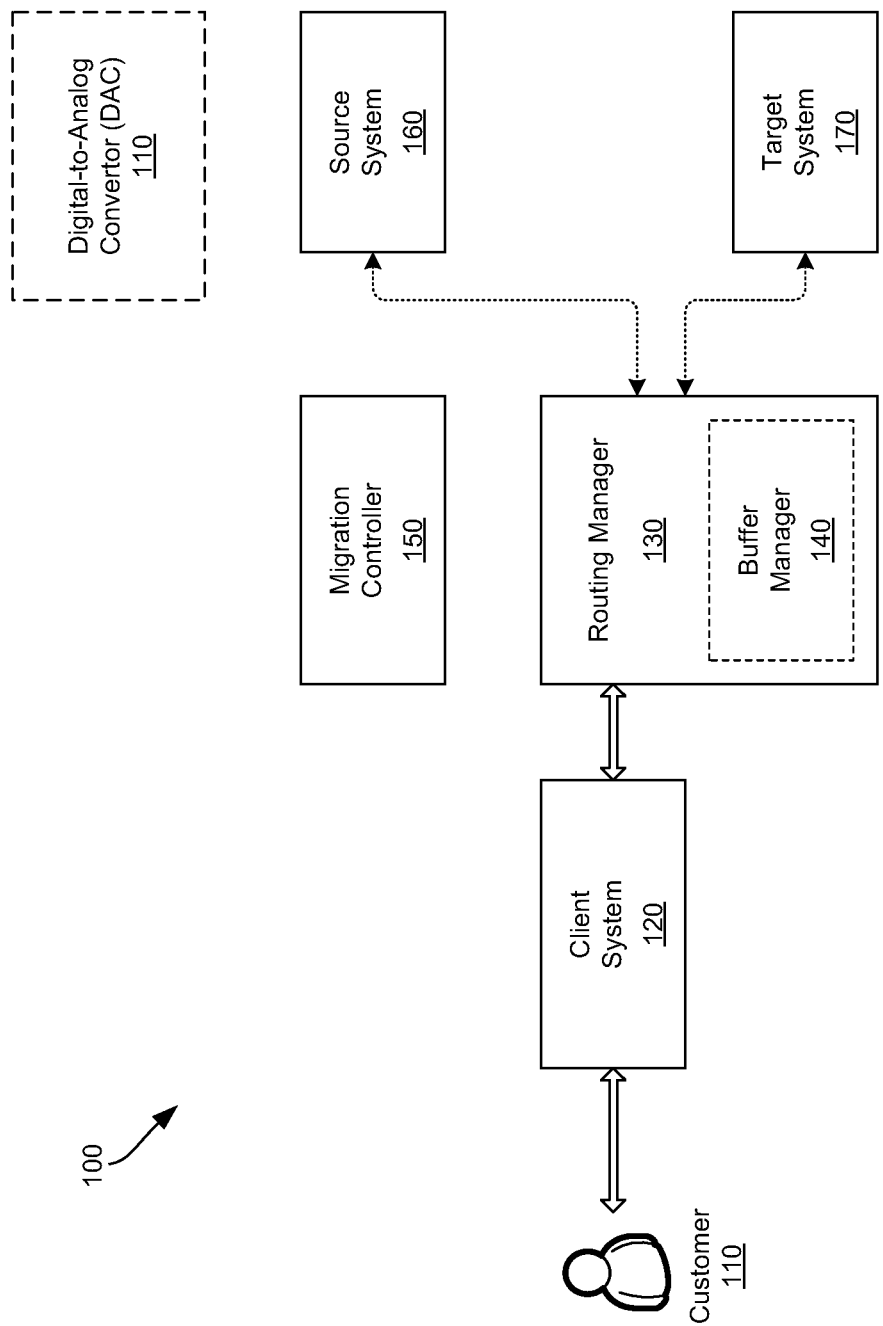
FIG. 1 illustrates an example setup that supports migrating data between systems without downtime.

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain implementations of the present disclosure may be found in method(s) and/or system(s) for migrating data between systems without downtime. In particular, the present disclosure provides method(s) and/or system(s) for moving or copying records from a source (e.g., old or legacy) system to a target (e.g., new) system. In this regard, the present disclosure is directed to solving the problem of moving a large number of records between two real-time systems where no downtime is permissible in either system, and/or where constant access to the records is required while they are in movement. The present disclosure provides methods and/or systems for migrating customer and transaction-related data from one customer-facing system to another, without requiring that functions be unavailable to the customer while the migration is taking place. In this regard, the presented approach described herein differs from currently available data migration approaches, which rely on either moving functionality used in the interactions with the clients from the one system (e.g., an old system) to the other (e.g., a new system) for the migration to be complete, or by making the functionality provided by the systems unavailable to the customer during the transition. The presented approach also differs from other approaches by allowing for handling of individual customer records rather than batches of customer records. In this regard, typically a data migration process selects a batch of records, confirms the metrics associated with that batch and moves the batch as a whole into the new system. This approach deals with individual customer records, and as such there may be no need for batch treatment.

In an example implementation, moving or copying records may be achieved by: (1) requesting a set of records from the source system; (2) receiving the consideration record set from the source system; (3) loading the consideration record set to the target system in a dormant state; (4) in real-time, attempting to verify the quality of the records in the consideration record set; and (5) activating each record in the target system, completing the migration.

FIG. 1 illustrates an example setup that supports migrating data between systems without downtime. Referring to FIG. 1, there is shown a setup 100, which may configured to support migrating data between systems without downtime. The setup 100 may comprise a client system 120, a routing manager 130, a buffer manager 140, a migration controller 150, a source system 160, and a target system 170.

Each of the client system 120, the routing manager 130, the buffer manager 140, the migration controller 150, the source system 160, and the target system 170 may comprise suitable circuitry for implementing various aspects of the present disclosure.

In operation, the setup 100 may be utilized to maintain and utilize data related to a plurality of individuals (e.g. customers associated with particular store or online site). In this regard, the customer data may be stored (e.g., in the source system 160), and various components of the setup 100 may then allow the customers to interacted (e.g., via the client system 120) with their data, such as to update their customer data (e.g., modify their personal information, redeem reward points from their balance, or earning points adding to their balance). In this regard, the client system 120 may comprise a user-specific electronic device, owned and/or operated by the consumer (either specifically for retail transactions or for various purposes including retail transactions). For example, the client system 120 may comprise, in that context, a user-operated personal computer (desktop or laptop), smartphone, tablet, or the like, which may be configured (e.g., by browsing and/or running particular applications) to shop from a particular retailer. Alternatively, the client system 120 may comprise a suitable provider-specific system configured for supporting user interactions with (only) a particular entity (e.g., retailer), and/or for use only in particular location (e.g., store). In this regard, the client system 120 may be configured to provide output to the users (e.g., displaying particular marketing information and/or product related data) and/or to receive input or feedback from the users (e.g., request for additional information, placement of order, etc.). For example, the client system 120 may comprise, in that context, an in-store personal computer (PC), an interactive kiosk, and the like. The disclosure is not limited, however, to any particular type of devices.

In an example implementation, interactions with the client system 120 may be result in locating and/or accessing particular customer data, which may be used to enable and/or support handling of requests from corresponding customers (associated with the customer data). In this regard, in a typical use scenario, requests by customers (e.g., the customer 110) may be received by the client system 120, and routed, via a suitable intermediary (e.g., the routing manager 130), from the client system 120 to the source system 160 or the target system 170, access corresponding consumer data (records) that may be stored therein. Accordingly, before a process to either move or copy records from source to target is initiated, it may be necessary to provide a way to ensure that requests from a client system 120 are ultimately handled by a data maintaining system (e.g., the source system 160 or the target system 170) in which the customer data (record) is active. For example, if the client system 120 forwards a user request requiring obtaining and/or modifying information in a customer record associated with customer 110, and the customer record was originally accessed in the source system 160 but is now active the target system 170, the requests from client system 120 must be handled in a way to account for that change. Various approaches may be utilized to ensure that requests from the client system 120 are forwarded to the correct system. For example, a customer database may be maintained, listing current customers along with the current system(s) that they may have corresponding customer data. Also systems used in handling the forwarding of the requests may be configured to first try the source system 160, then the target system 170 for the information. For example, a central component (e.g., the routing manager 130) may be used, to receive requests from the client system 120 and route the requests to either the source or target system 170, transparent to the client system 120. That component may then be configured to account for the data migration when handling the forwarding of requests.

In various implementations, the setup 100 may be operable to support copy migrating (and/or copying) of data between systems (e.g., the source system 160 and the target system 170). In this regard, data may sometimes be moved from old, legacy systems (e.g., the source system 160) to new, enhanced systems (the target system 170). Accordingly, the source system 160 may represent the system where data are being moved from; whereas the target system 170 may represent the system into which data are being moved. The migrated data may comprise customer data. The customer data may comprise one or more customer records, from one or many different data structures within the source system 160. Each customer record may be associated with particular customer 110. In this regard, the customer 110 may correspond to either a person located in a store or to a person who is online, where each person may need to access the customer data. The customer 110 may interact with the client system 120, which may be configured to interact indirectly (e.g., via the routing manager 130) with either or both of the source system 160 and the target system 170, on behalf of customers requesting and/or requiring access (e.g., read and/or write) to the customer data. Because it may be desirable to maintain access to data (especially data that may be accessed frequently, such as customer data), the data migration may be optimized, to at least reduce the duration of periods where such access may not be available, while maintaining integrity and security of the migrated data. This may be done by use of a member-by-member migration approach, in such a way that a customer data may be moved without disturbing access to the data and without requiring any downtime.

The migration controller 150 may be configured to manage various aspects of the data migration. In this regard, the migration controller 150 may handle the interaction(s) between the source system 160 and the target system 170, for the purposes of moving (migrating) data from one system to the other. The migration controller 150 may not be exposed to customers. Once the data movement is complete, the migration controller 150 typically would have no function anymore. The routing manager 130 may be configured to handle routing of customer interactions (e.g., requests) to the source system 160 and the target system 170. For example, the routing manager 130 may determine if the source system 160 or the target system 170 will serve the request from the client system 120. This may be left in place after the data movement is complete. The buffer manager 140 may be implemented as a component within the routing manager 130, to provide any required buffering. In this regard, use of the buffer manager 140 may improve the probability that a customer request can be handled by either the source system 160 or the target system 170 during data movement.

The migrating of data, and/or various operations or functions related thereto, in accordance with the present disclosure, may be configured based on one or more migrating related parameters. Examples of such parameters may comprise service level, customer related indicators, and unavailability window(s). In this regard, the service level may represent the expected amount of time a request from the client system 120 should take to process. After this amount of time has elapsed, the client system 120 will normally inform the customer that the request could not be completed. The customer related indicators may comprise, for example "active" and "migrated." In this regard, a customer is "active" in a system (e.g., the source system 160 or target system 170) if that system has the master version of the customer data associated with that customer, and that system is able to handle requests from the client system 120 relating to that customer. The customer data may only be active in either the source system 160 or the target system 170 at any given time. A customer is said to have been "migrated" when that customer is activated in the target system 170. The unavailability window(s) may correspond to time period(s) when customer data is not available to a client system 120 from either the source system 160 or the target system 170. Minimizing unavailability window(s) may be critical to avoiding customer inconvenience.

During an example data (e.g., customer records) migration process: (1) the migration controller 150 may decide which data to move; (2) may request the data (customer records) from the source system 160; (3) the source system 160 may read the data (customer records) and return it to the migration controller 150; (4) the migration controller 150 may load the data (customer records) to the target system 170; (5) the migration controller 150 may then mark the data (customer records) as "unavailable" in the source system 160 (e.g., de-assert the "available" status parameter or flag); (6) the migration controller 150 may then verify that the data (customer records) in the target system 170 matches the data (customer records) in the source system 160; (7) if the data (customer records) does not match, the data (customer records) may be marked as "available" in the source system 160 and marked for deletion in the target system 170, and the customer 110 may be added to a special handling list along with a data mismatch reason (essentially, this record goes back to step 1); if the data matches, the data (customer records) may be marked as "available" in the target system 170; and (8) processing customers may then continue until all data (customer records) has been moved. A similar process (as with the above described process for migrating data) may be utilized for copying data (e.g., customer records), such as from the source system 160 to the target system 170. Some of the steps, however, may be modified to account for the fact that data is copied rather than moved (migrated). For example, step 5 (specifically, the marking data (customer records) as "unavailable" in the source system 160) in the move process described above may be eliminated since data remain available on both systems.

Determining which customers to select in step 1 for a given round of execution may depend on the characteristics of the data being moved. Step 4 may be a simple load of the data straight from the source, or it may involve manipulating the data to suit data structures and requirements of the target system 170. A customer may go through steps 1-7 multiple times until the customer can finally be activated in the target system 170. This may be because the customer transacts frequently, which means the customer data may change often between steps 2 and 6, or there is some aspect of the customer's data that is not handled correctly by step 4.

In an example implementation, the migration controller 150 may incorporate a batch component and a real-time component, which may be utilized adaptively during data migration. For example, steps 1-4 may be done in real-time (by the real-time component) or alternatively by the batch component. In an example implementation, steps 1-4 may be handled by the batch component—e.g., because of the volume of records involved (20 billion) and the capabilities of the source system 160 to provide the data, where the batch component may handle operations attributed to the migration controller 150 in step 5-8. Step 6 may require the interrogation of both the source and the target system 170 in real-time to ensure that nothing has changed in the source system 160 after step 3. Depending on the implementation, marking the data as unavailable in the source system 160 can be done after step 6.

In addition to being able to respectively extract and load the data, the source system 160 and the target system 170 provides the following capabilities to the migration controller 150 via real-time application programming interfaces (APIs). In this regard, the APIs may comprise: an API to determine if a customer is active in the system; an API to activate or deactivate a customer in the system (the systems must also respect this status within their system, making sure that no processes act on inactive records); and one or more APIs to provide information for the migration controller 150 to perform the verification in step 6. If they meet these requirements, the source system 160 and the target system 170 do not need to know about the migration taking place. Determining the correct data elements to verify in step 6, and the tolerances for a difference (if any), may be made adaptively—e.g., it may be a business decision. For example, in an implementation, such parameters as key metrics (balance associated with particular account), key data elements (email address, etc.), key timestamps (last time a record was updated) and checksums or totals (number of transactions, etc.) may be verified, and any case where any difference existed between the source system 160 and the target system 170.

In some example implementations, various measures may be adapted or utilized to reduce the unavailability window(s) during data migrations. For example, one issue that may arise with the previous process for migrating data using the migration controller 150 is that during steps 5-7 customer data may be unavailable in both the source system 160 and the target system 170 (thus creating an 'unavailability window'). During this unavailability window', customer requests (for customer data) could be declined by both the source system 160 and the target system 170, resulting in "downtime" for that particular customer. Depending on the capabilities of the source system 160 and the target system 170 to perform this update, the unavailability window could be acceptably short (e.g., less than 20 milliseconds) or long. Accordingly, to reduce the probability that a request will be declined by both of the source system 160 and the target system 170, the buffer manager 140 may be utilized by the routing manager 130. In this regard, the buffer manager 140 may be utilized in holding a request that has been declined by both the source system 160 and the target system 170, and then retry the request after a specified period of time, in the hope that the customer may then be active in either the source system 160 or the target system 170. The length of time the buffer manager 140 will wait before retrying may depend on, for example, the service level. The buffer manager 140 may be configured to, for example, allow enough time for either the source system 160 or the target system 170 to actually service the request during the service level window.

During an example routing process, via the routing manager 130, which had been enhanced by use of buffering (e.g., buffer manager 140): (1) the routing manager 130 may ask the source system 160 if the customer is "active" in that system; (2) if the customer is "active" in the source system 160, the routing manager 130 may send request from the customer (received via the client system 120) to the source system 160; (3) if the customer is not "active" in the source system 160, the routing manager 130 may send the request to the target system 170 instead; (4) if the response from the target system 170 is that the customer is not "active" there, the routing manager 130 may buffer the request, e.g., via the buffering manager 140, and may wait for a particular duration (e.g., "WaitPeriod", as described below); (5) after WaitPeriod, the routing manager 130 may attempt the request against the target system 170; (6) if the request is successful against the target system 170, the routing manager 130 may send the reply back to the client system 120; and (7) if the request is unsuccessful against the target system 170, the routing manager 130 may attempt the request against the source system 160, then send the source's reply back to the client. In this regard, the reply may be an indication that the pertinent record is "available" or is "unavailable".

The wait period (WaitPeriod) may be determined adaptively and/or based on various factors or parameters. For example, the WaitPeriod may be determined in accordance with the following equation (Equation 1):

$$WaitPeriod = SLA - AlreadyElapsed - RetryAndRespond$$

Where SLA (e.g., in milliseconds) correspond to the Service Level (e.g., in milliseconds); AlreadyElapsed correspond to the duration (in millisecond) of steps 1-3 in the above process, which was consumed before the request is buffered; and RetryAndRespond correspond to the expected duration (in milliseconds) steps 5-7—e.g., time these steps are to take (e.g., may be determined based on previous runs).

The routing manager 130 may be configured to handle customer requests (passed from the client system 120). Various approaches may be used to configure the handling performed by the routing manager 130. For example, the routing manager 130 may be configured to handle customer requests in a keyed manner. In this regard, the routing manager 130 may maintain a list of keyed-customers—e.g., each customer may have corresponding one or more key fields, which may be set based on particular information that may enable uniquely identifying the customers, such as account number. Accordingly, when the routing manager 130 receives a call from the client system 120, and the customer is identified by a key field, the routing manager 130 may apply a keyed based handling process, which may comprise: (1) ask the source system 160 if the customer is active there; (2) if the customer is "active" in the source system 160, send the request to the source system 160 and send the reply back to the client system 120; and (3) if the customer is not "active" in the source system 160, send the request to the target system 170 and send the reply back to the client system 120. In this regard, it may not be necessary to ask the target system 170 if the customer is "active" there (before stop 3), based on the assumption that the target system 170 would respond with an expected error code to the client system 120 if the customer is not found there.

In some example implementations, the routing manager 130 may be configured to handle customer requests in a non-keyed manner. In this regard, the routing manager 130 may not maintain a list of keyed customers. Accordingly, when the routing manager 130 receives a request form the client system 120, the customer may not be uniquely identified (e.g., by a key field). Rather, the routing manager 130 may instead lookup the customer by a field (or a plurality of fields) which may not be guaranteed to be unique (e.g., phone number) when handling the request. For example, a non-keyed handling process may comprise: (1) asking the source system 160 for a list of "active" customers that match the lookup field criteria; (2) asking the target system 170 for a list of "active" customers that match the lookup field criteria; (3) combining the list of customers from the source system 160 and the target system 170; and (4) returning the combined list to the client system 120. The client system 120 may then select a customer and make a particular request to the routing manager 130. For example, the client system 120 may then convert the request into keyed request, which may be handled as described with respect to the keyed-based handling process described above.

Figure 2:
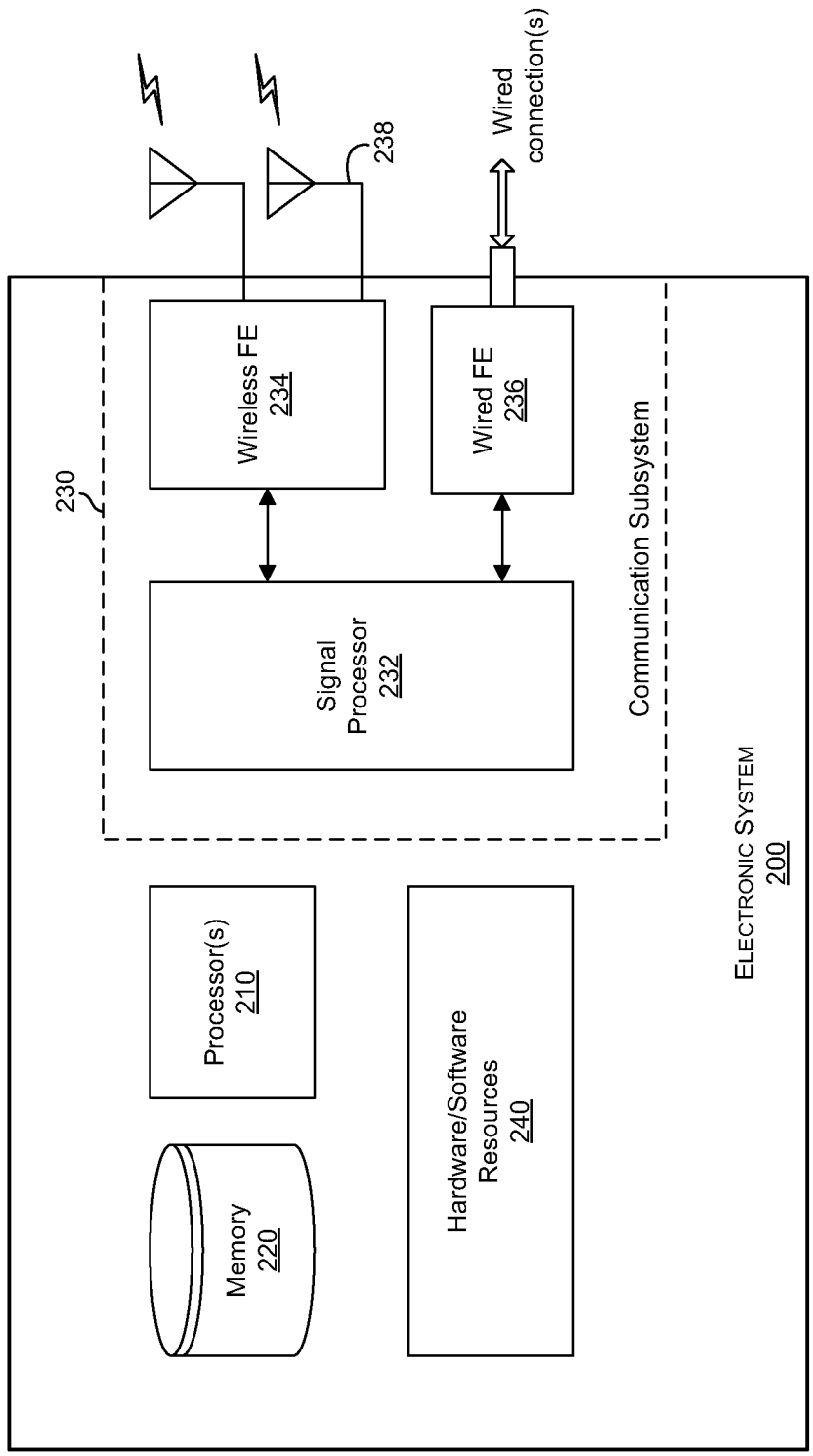
FIG. 2 illustrates an example electronic system, which may be configured to manage migrating data between systems without downtime.

FIG. 2 illustrates an example electronic system, which may be configured to manage migrating data between systems without downtime. Referring to FIG. 2, there is shown an electronic system 200.

The electronic system 200 may comprise suitable circuitry for implementing various aspects of the present disclosure. For example, the electronic system 200, as used herein, may comprise suitable circuitry for performing or supporting various functions, operations, applications, and/or services, which may, for example, pertain to migration of data between systems, particularly in manner that ensure no downtime. The functions, operations, applications, and/or services performed or supported by the electronic system 200 may be run or controlled based on pre-configured instructions and/or user instructions. For example, the electronic system 200 may be configured and/or implemented as a network element, for use in receiving and/or handling broadcasts (e.g., satellite, cable, terrestrial broadcast, broadband, etc.) or similar types of communications. The electronic system 200 may correspond to, for example, one or both of the routing manager 130 and the migration controller 150 described in FIG. 1.

In the example implementation depicted in FIG. 2, the electronic system 200 may comprise a processor 210, a memory 220, a communication subsystem 230, and hardware/software resources 240.

The processor 210 may comprise suitable circuitry for processing data, for executing or running particular services, tasks and/or applications, and/or for controlling and/or managing operations (e.g., of other components in the electronic system 200). For example, the processor 210 may configure and/or control operations of various components and/or subsystems of the electronic system 200, by utilizing, for example, one or more control signals. Further, the processor 210 may enable running and/or execution of applications, programs and/or code, which may be stored, for example, in the memory 220. The processor 210 may comprise a general purpose processor (e.g., central processing unit (CPU)), which may be configured to perform or support particular types of operations (e.g., audio related operations), or a special purpose processor—e.g., a digital signal processor (DSP), a baseband processor, and/or an application processor (e.g., ASIC).

The memory 220 may comprise suitable circuitry for providing permanent and/or non-permanent storage, buffering, and/or fetching of data, which may be used, consumed, and/or processed in the electronic system 200. In this regard, the memory 220 may comprise different memory technologies, including, for example, read-only memory (ROM), random access memory (RAM), Flash memory, solid-state drive (SSD), and/or field-programmable gate array (FPGA). The memory 220 may store, for example, configuration data, which may comprise parameters and/or code, comprising software and/or firmware.

The communication subsystem 230 may comprise suitable circuitry for supporting communication of data to and/or from the electronic system 200. For example, the communication subsystem 230 may comprise a signal processor 232, a wireless front-end 234, a wired front-end 236, and one or more antennas 238. The signal processor 232 may comprise suitable circuitry for processing signals transmitted and/or received by the electronic system 200, in accordance with one or more wired or wireless protocols supported by the electronic system 200. The signal processor 232 may be operable to perform such signal processing operations as filtering, amplification, up-conversion/down-conversion of baseband signals, analog-to-digital conversion and/or digital-to-analog conversion, encoding/decoding, encryption/decryption, and/or modulation/demodulation.

The wireless front-end 234 may comprise circuitry for performing wireless transmission and/or reception (e.g., via the antenna(s) 238), such as over a plurality of supported RF bands. The antenna(s) 238 may comprise suitable circuitry for facilitating over-the-air transmission and/or reception of wireless signals, such as within certain bandwidths and/or in accordance with one or more wireless interfaces supported by the electronic system 200.

The wired front-end 236 may comprise suitable circuitry for performing wired based transmission and/or reception, such as over a plurality of supported physical wired media. The wired front-end 236 may support communications of RF signals via the plurality of wired connectors, within certain bandwidths and/or in accordance with one or more wired protocols (e.g., Ethernet) supported by the electronic system 200.

The hardware/software (HW/SW) resources 240 may comprise various hardware and/or software components of the electronic system 200, which may be utilized for various purposes. The HW/SW resources 240 may comprise dedicated components that are particularly designed and/or implemented to perform particular functions and/or operations, and/or general purpose components that may be configured to perform particular functions and/or operations. For example, the HW/SW resources 240 may comprise user input/output (I/O) resources (e.g., suitable components built-into and/or coupled to the electronic system 200, such as display, mouse, keyboard, keypad, touchscreen, etc., as well any circuitry required to operate these components), audio/video related resources (e.g., suitable components, such as display, microphones, speakers, etc., as well any circuitry required to operate these components), applications (as well any circuitry required to run such applications and/or to store code corresponding thereto), etc.

In operation, the electronic system 200 may be configured as a communication element—e.g., in a network or a communication system, such as the communication system 100 of FIG. 1. For example, the communication subsystem 230 may be utilized in setting up and/or utilizing connections that may be used in communicating signals (e.g., carrying data) to and/or from the electronic system 200 (e.g., within communication system 100). The connections may be established using wired and/or wireless links, which may be setup (and used thereafter) via the wired front-end 236 and/or the wireless front-end 234, respectively. These links may then be used to transmit and/or receive data, which may be used in and/or generated by the electronic system 200 (e.g., via the HW/SW resources 240). For example, TV and other multimedia content (audio and/or video) may be played via suitable HW/SW resources 240 in the electronic system 200.

In some instances, the electronic system 200 may be configured to support migration of data between systems—e.g., a first (or source) system and a second (or target) system, such as when updating from a legacy system to a newer, enhanced system. In particular, in various example implementations the electronic system 200 may be used to support and/or enable migration of data between systems without downtime and/or in adaptive manner (e.g., where data integrity is maintained and/or where interaction with users are continued and accounted for during the migration). In this regard, the electronic system 200 may be used to manage and/or control the migration of the data, and/or to handle at least certain aspect of user interactions (e.g., routing of user requests using or affecting user data) during the migration. For example, the electronic system 200 may correspond to, and/or may be used to implement at least a portion of the routing manager 130, the buffer manager 140, and/or the migration controller 150, substantially as described with respect to FIG. 1. Thus, the electronic system 200 may be operable to implement and/or perform one or more of the operations, functions, and/or processes, described with respect to migrating of the data, and/or the handling of the user interactions (e.g., requests) described in FIG. 1.

Figure 3:
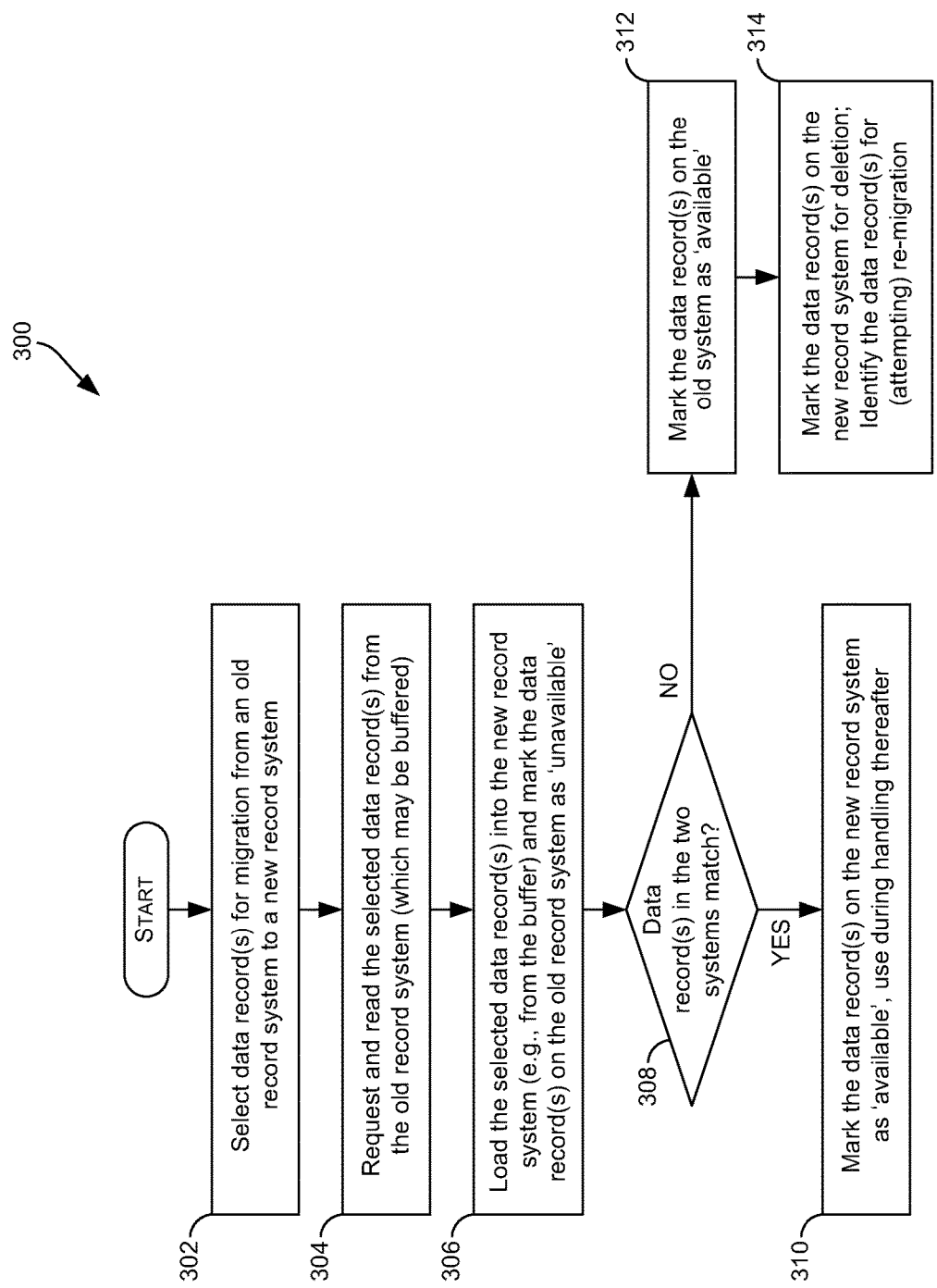
FIG. 3 is a flowchart illustrating an example process for migrating data between systems without downtime.

FIG. 3 is a flowchart illustrating an example process for migrating data between systems without downtime. Referring to FIG. 3, there is shown a flow chart 300 comprising a plurality of example steps, which may be performed in an electronic system (e.g., the electronic system 200 of FIG. 2) to provide and/or support migrating data between systems (e.g., a legacy system and new system) without downtime.

In step 302, particular data record(s) may be selected for migration from a source (e.g., old) system to a target (e.g., new) system. The selected data record(s) may be associated with one or more particular users (e.g., consumers affiliated with particular retailer or business). The migration process described in flow chart 300 may be performed while continuing to process and/or handle user interactions that may affect the data records.

In step 304, the selected data record(s) may be requested from the source system, which may read the data (e.g., from storage resources associated therewith) and may return it. In this regard, the returned data may be temporarily buffered while being migrated.

In step 306, the selected data record(s) may be loaded into the target system and the (original) data record(s) (the copies still existing in the source system) may then be mark as "unavailable" in the source system. For example, each data record may have associated with it an availability status parameter or flag, which may be de-asserted to indicate that the corresponding data record is unavailable.

In step 308, the data record(s) in the target system may be verified. This may be done by comparing the (copied) data record(s) in the target system with the (original) data record(s) in the source system. While the example process describe in FIG. 3 comprise marking the data record(s) as "unavailable" in the old system (step 306) is done before verifying the data record(s) in the new system (step 308) by comparing the copies of the pertinent data record(s) in both systems, the disclosure is not so limited, and in some implementations, the marking the data record(s) as "unavailable" in the old system may be done after the verification. In this regard, where the marking (step 306) is done after the verification (step 308) there may be a possibility that the pertinent data record(s) may be updated in the old system during the time the verification (step 308) is being done. This, however, may be accounted for (e.g., by incorporating additional checks, to determine when such changes occur, and/or to account for them, such as by re-comparing the data (i.e., re-applying step 308). In instances where the data record(s) the data matches, the process may proceed to step 310, whereby the data record(s) may be marked as "available" in the target system (e.g., by asserting the availability status parameter or flag associated with each matching data record).

Returning step 308, in instances where the data record do not match, the process may proceed to step 312. In step 312, (original) data record(s) in the source system may be marked as "available" in the source system (e.g., by asserting the availability status parameter or flag associated with each matching data record).

In step 314, the (copied) data record(s) in the target system may be marked for deletion, and the mismatched data record(s) and/or the user(s) with which the mismatched data record(s) may be associated may be identified for re-migration—e.g., by being added to a special handling list along with a data mismatch reason. The re-migration may then be attempted at some point thereafter (e.g., after particular time, when completing migrating remaining data records, etc.), by repeating the process starting with step 302 or step 304.

Figure 4:
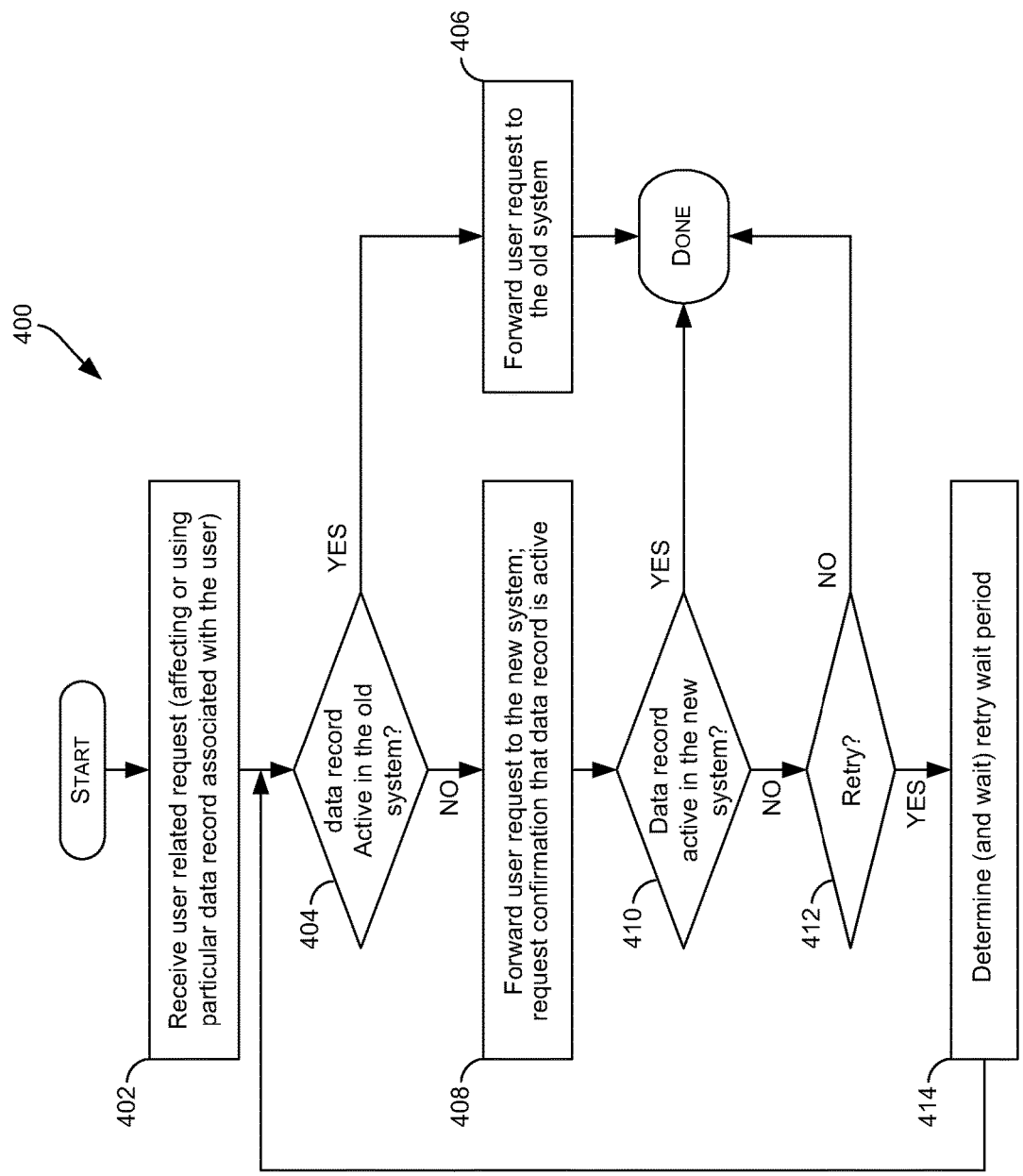
FIG. 4 is a flowchart illustrating an example process for handling user requests during migration of data between systems without downtime.

FIG. 4 is a flowchart illustrating an example process for handling user requests during migration of data between systems without downtime. Referring to FIG. 4, there is shown a flow chart 400 comprising a plurality of example steps, which may be performed in an electronic system (e.g., the electronic system 200 of FIG. 2) to provide and/or support handling of user requests during migration of data between systems (e.g., a legacy system and new system) without downtime.

The process corresponding to the flow chart 400 may enable routing user requests (or other interactions) affecting or requiring user related data (e.g., records) while data migration from a source (e.g., old) system to a target (e.g., new) system is underway (or may have been done recently).

In step 402, a user request (or interaction) affecting or requiring user of particular data record(s) associated with a particular user (e.g., a consumer affiliated with particular retailer or business) may be received.

In step 404, it may be determined whether the particular data record(s) are active in the source system. The check may be performed separately for each pertinent data record. The determination may comprise, for example, checking whether the data record(s) associated with the particular user (customer) are still marked as "active" in the source system. This may indicate that the data has not yet been migrated, or that a prior attempted migration has failed (as described with respect to FIG. 3 for example).

In instances where it is determined that the particular data record(s) is/are active in the source system, the process may proceed to step 406, where the received user request (or interaction) may be forwarded to the source system. The process may then terminate, such as after sending in response to the user request a reply back indicating success outcome (and/or the particular used record system—that is the source system).

Returning to step 404, in instances where it is determined that the particular data record(s) are not active in the source system, the process may proceed to step 408. In step 408, the received user request (or interaction) may be forwarded to the target (new) system instead. Further, a confirmation that the particular data record(s) and/or the particular user (consumer) are active in the target system may be requested.

In step 410, it may be determined whether the particular data record(s) is/are active in the target system. Again, the check may be performed separately for each pertinent data record. The check may simply be done by processing the response from the target system—e.g., to determine if a received response from the target system indicates that the particular data record(s) and/or the particular user (consumer) are (or are not) "active" there. In instances where it is determined that the particular data record(s) and/or the particular user (consumer) are "active" in the target system, the process may terminate (as the request has already been forwarded), such as after sending in response to the user request a reply back indicating success outcome (and/or the particular used record system—that is the target system).

Returning to step 410, in instances where it is determined that the particular data record(s) and/or the particular user (consumer) are not "active" in the target system, the process may proceed to step 412, where it may be determined whether the forwarding of the user request (or interaction) to the target system may be re-tried. In this regard, the request may be buffered to enable re-trying forwarding the request.

The retrying determination may be based on one or more criteria or parameters. For example, the system may be configured to attempted (or not) retrying to forward request. In this regard, a retry timer and/or counter may be preset and/or adjusted (or determined) adaptively—e.g., based on timing considerations, such in accordance with permitted total response time. In instances, where no (further) retries are possible, the process may terminate (with, optionally, error message being generated and sent in response to the received user request). In some implementations, where request is (ultimately) unsuccessful against the target system (e.g., after all retries), the request may be attempted against the source system before sending the error message.

In instances where (further) retries are possible, the process may proceed to step 414. In step 414, a particular wait period may be determined (e.g., being determined based on pertinent timing consideration, as described with respect to the determination of the "WaitPeriod" in accordance with Equation 1, and described with respect to FIG. 1), and after waiting that period (e.g., using a timer that can be adaptively set), the process may loop back—e.g., to step 408, to re-forward the user request to the new system, or to step 404 (as shown in FIG. 4) to re-assess the status of pertinent record(s) in both systems. Also, in instances where a particular number of retries is permitted, a retry counter may be incremented (or decremented) before looping back to step 408.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for migrating data between systems without downtime.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
   handling in an electronic system, user requests during migration of data records from a first record system to a second record system, the data migration being performed such that data records remain accessible and available during the migration; the handling comprising:
      receiving by the electronic system a user request;
      determining at least one data record from the data records that is associated with the received user request;
      determining if a copy of the at least one data record in the first record system is still active;
      when the copy of the at least one data record in the first record system is still active, forwarding the user request by the electronic system to the first record system; and
      when the copy of the at least one data record in the first record system is not active, forwarding the user request by the electronic system to the second record system.

2. The method of claim 1, further comprising retrying to forward the user request to the second record system based on a determination that the user request is not handled.

3. The method of claim 2, further comprising determining that the user request is not handled based on reception from the second record system of an indication that a copy of the at least one data record in the second record system is not active in the second record system.

4. The method of claim 2, further comprising retrying to forward the user request to the second record system after a particular wait period.

5. The method of claim 4, further comprising determining a particular wait period for each user request.

6. The method of claim 4, further comprising determining the particular wait period based on level of service associated with the user request.

7. An electronic system for handling user requests during migration of data records from a first record system to a second record system, wherein the data migration is performed such that data records remain accessible and available during the migration, the system comprising:
   at least one processor configurable for processing data, for executing or running particular services, tasks and/or applications, and/or for controlling and/or managing operations in the electronic system,
   wherein the electronic system is configured to:
      receive a user request;
      determine at least one data record from the data records that is associated with the received user request;
      determine if a copy of the at least one data record in the first record system is still active;
      when the copy of the at least one data record in the first record system is still active, forward the user request to the first record system; and
      when the copy of the at least one data record in the first record system is not active, forward the user request to the second record system.

8. The electronic system of claim 7, wherein the electronic system is configured to retry forwarding the user request to the second record system based on a determination that the user request is not handled.

9. The electronic system of claim 8, wherein the electronic system is configured to determine that the user request is not handled based on reception from the second record system of an indication that a copy of the at least one data record in the second record system is not active in the second record system.

10. The electronic system of claim 8, wherein the electronic system is configured to retry forwarding the user request to the second record system after a particular wait period.

11. The electronic system of claim 10, wherein the electronic system is configured to determine the particular wait period for each user request.

12. The electronic system of claim 10, wherein the electronic system is configured to determine the particular wait period based on level of service associated with the received user request.

* * * * *